United States Patent [19]
Bertin

[11] 3,921,992
[45] Nov. 25, 1975

[54] SEALS NOTABLY FOR ROTARY SHAFTS

[75] Inventor: Jacques Bertin, Asnieres, France

[73] Assignee: Paulstra, Levallois Perret, France

[22] Filed: Dec. 5, 1974

[21] Appl. No.: 529,725

[30] Foreign Application Priority Data
Dec. 21, 1973 France .................. 73.46114

[52] U.S. Cl. .................. 277/237; 277/163
[51] Int. Cl.² .................. F16J 15/32
[58] Field of Search ............ 277/237, 157–165, 277/181–184

[56] References Cited
UNITED STATES PATENTS

| | | | |
|---|---|---|---|
| 2,334,349 | 11/1943 | Mika | 277/237 |
| 2,485,011 | 10/1949 | Niessen et al. | 277/237 |
| 3,092,427 | 6/1963 | Sadler et al. | 277/165 |
| 3,162,456 | 12/1964 | Williams | 277/164 |
| 3,186,681 | 6/1965 | Lowrey | 277/170 |
| 3,256,005 | 6/1966 | Taylor | 277/112 |
| 3,275,348 | 9/1966 | Scott | 277/112 |
| 3,346,265 | 10/1967 | Rhoads et al. | 277/164 |
| 3,396,978 | 8/1968 | Balkin et al. | 277/237 |

Primary Examiner—Robert I. Smith
Attorney, Agent, or Firm—Larson, Taylor & Hinds

[57] ABSTRACT

A seal for a rotary shaft comprises a diaphragm of elastomer in the shape of a portion of a cupola, connected through its large base to a rigid armature and ending, on the side of its small base, in at least one sealing lip designed to contact the shaft. The profile of the concavity of the inner face of the cupola is continuous up to the contact edge of the lip so that the angle of incidence of the inner profile with the axis of the shaft, at the location of said edge, has a value, at least before mounting, of at least 35°.

5 Claims, 3 Drawing Figures

SEALS NOTABLY FOR ROTARY SHAFTS

The invention relates to seals, notably for rotary shafts (as assumed below), such seals being characterised by a lip of elastomeric material surrounding the shaft and adapted to be urged against the latter by means of a spring, said lip being borne by an armature positioned at a certain distance from the shaft and to which it is connected by a diaphragm or cuff, also of elastomeric material.

To fix ideas, there is shown in FIG. 1 of the accompanying drawing, in half section, the assembly of a shaft A and of a seal of this type whose abovementioned lip 1, gripped by a concentric spring 2, is connected to an armature 3 coaxial with the shaft by a diaphragm 4 forming an integral part with the lip and adhered to said armature. This diaphragm 4, in present constructions, has mostly the form of a frustrum whose largest base is connected to the metallic armature 3, whilst the smallest base is attached to the lip proper 5. The liquid to be sealed F is generally on the side of the lip and of its spring 2, and its pressure is exerted on the diaphragm 4 in the direction which tends to press it towards the axis X—X of shaft A. The surface 5 of the lip, on the outer side to the side to be sealed, must have a suitable angle $\theta$, which leads must often to the presence of a fillet $5_1$ with the corresponding inner surface of the diaphragm 4. There is hence a discontinuity in the profile of the inner surface $4_1$ of the diaphragm 4, at the place of this fillet.

It will be noted that assemblies of this type give rise to a certain number of defects.

Firstly, when the liquid F to be sealed is brought to a pressure greater than that existing in the external environment, it tends, as indicated above, to deform the diaphragm 4, hence its inner surface $4_1$ and this in a direction which, having repercussion on the surface 5 of the lip 1, causes a reduction in the angle $\theta$. Now, this angle cannot be selected too high initially since, if this was so, there would be risk of causing, by reason of the existence of the discontinuity occuring at the place of the fillet with the diaphragm 4, turning back of the lip at the time of assembly of the seal. It is hence limited in practice to values mostly less than 25°. It follows that, under the effect of the pressure of the fluid F, and of the deformation of the diaphragm, said angle may be brought to assume very small values, so that the contact between the lip 5 and the shaft, instead of being linear along the edge 6, as is desirable, tends to be established behind this edge in a more or less wide zone such as $6_1$. This widening of the zone of contact causes a considerable increase in friction. On the other hand, a wedge of oil tends to penetrate between the zone of actual contact and the edge 6, whence there is a possibility of leakages.

This modification of the position of contact can also occur with conventional sealing rings, even in the absence of pressure, when the fluid has characteristics such as it causes the elastomeric material to swell, which also, is often encountered. This expansion is moreover increased by rises in temperature which tends to produce the same effects.

It is to be noted that it has already been proposed to give the diaphragm a curvilinear contour, but without eliminating the discontinuity between the inntler profile of the diaphragm and the profile of the lip, so that this modification by itself was incapable of eliminating the abovementioned difficulties.

To remedy these drawbacks, according to the invention seals of the type concerned are made to include a diaphragm of elastomer in the form of a cupola which, through its large base is connected to a rigid armature and which through its small base, constitutes the sealing lip intended to come into contact with the shaft, the continuity of the internal concave profile of the diaphragm being maintained upto the contact edge of the lip, where the angle $\theta$ of the tangent to said profile, with the axis of the shaft, has, at least before mounting, a value of at least 35°.

Such a form enables the above indicated drawbacks to be entirely remedy.

Due to the combination claimed, the effects of pressure and temperature cannot result in making the angle $\theta$ fall below a suitable limiting value for which the contact with the shaft remains substantially linear. On the other hand, due to the continuity of the profile, there is no risk of turning over on assembly. Lastly, due to the maintenance of this linear contact and to the reduction in friction, the assembly will withstand favourably axial thrusts, in the case of shafts subject to oscillations of this type, along directions such as f and f', FIG. 1.

The said invention consists, apart from the above specified main feature, of certain other features which are preferably used to the same time and which will be more explicitly considered below.

It contemplates more particularly certain types of application (notably that for which it is applied to rotary shaft seals), as well as certain embodiments, of said features; and it provides, more particularly again and this by way of new industrial products, seals of the type concerned including the application of the same features, as well as the special elements adapted for their construction and the assemblies using such seals.

The invention will in any case be well understood by means of the additional description which follows, as well as of the accompanying drawing, which description and drawing are, of course, given primarily by way of indication.

FIG. 1 of this drawing, shows in half section, as indicated above, a seal of the usual type.

Figure 1:
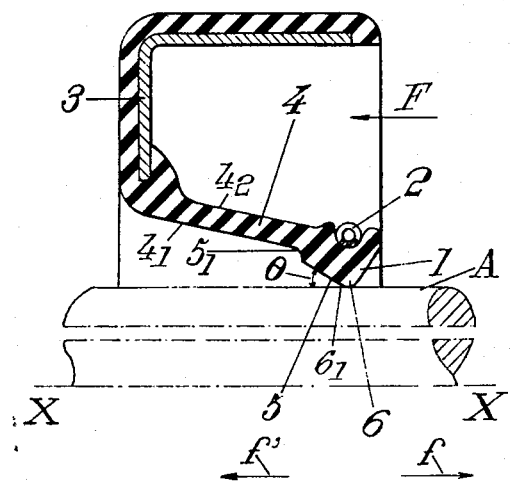

According to the invention and more especially according to those of its types of application, as well as according to those embodiments of its various parts, to which it would appear the preference should be given, in order for example to construct a seal for a rotary shaft, for example a seal fixed with respect to the shaft (it being understood that the invention would be applicable also to a rotary joint), procedure is as follows or in similar manner.

The seal is constituted from essential elements known and already indicated above, that is to say the armature 3 supporting the seal, and the seal proper comprising the lip 1, adapted to come into contact with the shaft A along the edge 6, the spring 2 and the diaphragm 4 fast to the armature 3.

Figure 2:
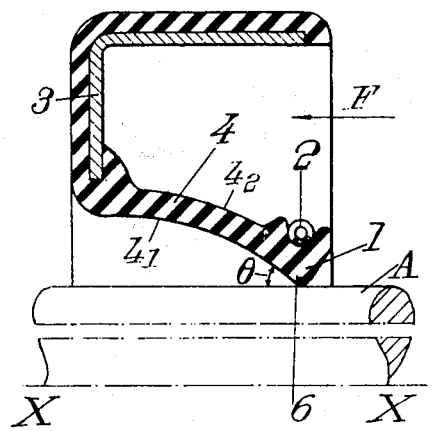
FIG. 2 shows similarly the same seal constructed according to one embodiment of the invention.

However, according to the invention (FIGS. 2 and 3), the diaphragm 4 is given a contour of a cupola whose inner profile 4 is extended regularly upto the edge 6, hence without providing the connecting cone 5 of the known solution shown in FIG. 1.

Figure 3:
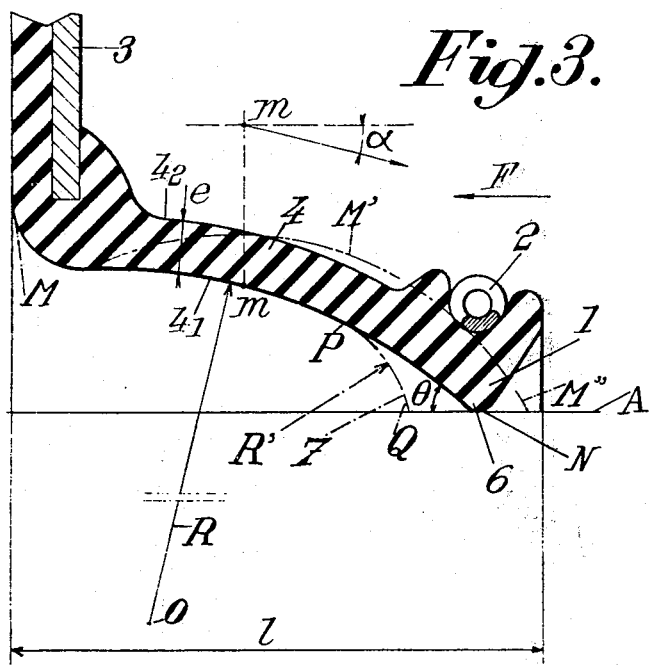
FIG. 3 shows in partial section the same embodiment of a seal, on a larger scale.

Such a diaphragm, which may be of constant or variable cross section, has for example, as regards notably its inner profile 4:

either the form of a spherical surface whose center would then be on the axis X—X of the shaft A, or in the form of a toroidal surface generated by any suitable profile MN (FIG. 3).

The inner profile 4 may be, as assumed in FIG. 3, an arch of radius R and of center O disposed in a suitable manner, before or beyond the axis X—X, or have a suitable tapered curvature.

The radius R depends principally on the width of the joint. It is in fact the ratio of the opened out length of the profile to the radius which determines the curvature and also the value of $\theta$. In a general way, it seems advantageous to give this radius, in the embodiment shown, a value of the same order of magnitude as the width 1 of the seal (FIG. 3).

However it should be noted that the radius of curvature of this profile is not necessarily constant and that, for example and as shown partially and in interrupted line in FIG. 3 at MN, it could comprise at least two circular arcs of different radii R and R', the radius diminishing close to the edge 6.

It is not necessary either for the arc MN to be, at its beginning at M on the armature, substantially parallel to the axis X—X, as shown. If necessary, the tangent to the profile, at the beginning at M, could be inclined with respect to the axis X—X, along a positive or even negative angle, as shown in interrupted line at M M' M'' in FIG. 3.

It is to be noted that the outer profile $4_2$ will be adapted to the inner profile by being terminated at its free end in the groove intended to receive the spring 2. The thickness $e$ between the two profiles can be constant or variable and selected in any case sufficient to counter the reversal of the lip 1 constituting the end of the diaphragm so constructed.

The arrangement according to the invention hence permits, contrary to the usual solution providing an interruption in the continuity at $5_1$ (FIG. 1), the direct connection of the abovementioned cupola to the sealing edge at 6, that is to say that the angle $\alpha$, made by the tangent at a point m of the profile (FIG. 3), varies in a continuous manner up to the edge 6, and that there can thus be obtained a relatively large connecting angle $\theta$, for example of the order of 35° to 45°, at least before mounting, for values of R of the abovementioned order of magnitude, whence the possibility of easily reducing at 6 the resulting area of contact of the clamping and, consequently also the frictional torque, the heating and the wear which it thereby causes.

As a result of which, it is hence possible, due to the invention, to produce seals whose functioning and the advantages which result therefrom, are as follows.

The particular shape given to the diaphragm 4 and the extension of its useful length which results thereby have the effect of making it more supple both in the radial direction and the axial direction, so that it operates in the manner of a bellows.

Besides, due to the relatively large value of $\theta$, heating is eliminated and wear is reduced.

On the other hand, the arrangement adopted, according to the invention, has the effect of reducing the size of the assembly, hence the inertia of the lip 1 which is applied to the shaft through the point of a more acute V: in consequence it can follow with more facility the very reduced movements and at a high rate which are produced in the case of "whipping" of the shaft at high speeds and which constitute a great obstacle to the solution of the problem of sealing.

Finally, as regards the thermal expansion due to operation of the seals concerned, the swelling which results therefrom occurs mainly in the central portion of the bellows, due to the elasticity of the latter. Through this fact, the expansion only has repercussions on the relatively weak forces at the ends and notably on the lip 1 whose gripping thus undergoes only an immaterial reduction.

These various results and advantages have been confirmed by experimental tests.

Seals according to the invention have been tested comparatively with seals of conventional type of the same dimensions. The tests were carried out on test benches enabling the reproduction not only of the actual conditions of operation, but also aggravating the severity thereof, notably by sudden variations in speed, in excess speeds, in decentering and vibration of the shaft, if necessary whilst increasing the temperature of the fluid to be sealed. The time necessary for the appearance of the first leakages is then measured, and then the volume of leakage in a certain time.

Under identical conditions of test, it was verified that it was much more difficult to obtain leakages with a seal with a curvilinear profile and that the leakages were smaller, the improvement observed, variable according to the particular case, being comprised between 10 and 40% and all the greater as the test was more severe.

As is self-evident and as emerges already from the foregoing, the invention is in no way limited to those of its types of application and embodiments which have been more especially envisaged; it encompasses, on the contrary, all modifications.

I claim:

1. Seal, notably for a rotary shaft, said seal comprising a diaphragm of elastomer in the shape of a portion of a cupola or the like, connected through its large base to a rigid armature and ending, on the side of its small base, in at least one sealing lip designed to come into contact with the shaft or the like, the profile of the concavity of the inner face of the cupola being kept continuous up to the contact edge of the lip so that the angle of incidence of the inner profile with the axis of the shaft, at the location of said edge, has a value, at least before mounting, of at least 35°.

2. Seal according to claim 1, wherein the inner profile of the diaphragm is of circular formation, with its center positioned before or beyond the axis of the shaft.

3. Seal according to claim 1, wherein the inner profile of the diaphragm is a circle, with its center positioned on the axis of the shaft.

4. Seal according to claim 1, wherein the inner profile of the diagphragm has a tapered form, with a radius of curvature diminishing as it recedes from the side of the contact edge of the lip, so as to enable the angle of incidence at the contact with the shaft to increase.

5. Seal according to claim 1, wherein the angle of the profile with the axis of the shaft, at the location of the edge, is at least before mounting, of the order of 35° to 45°.

\* \* \* \* \*